United States Patent
Takahashi et al.

(10) Patent No.: US 11,133,565 B2
(45) Date of Patent: Sep. 28, 2021

(54) METAL-AIR BATTERY AND METHOD OF USING THE SAME

(71) Applicant: FUJIKURA COMPOSITES INC., Tokyo (JP)

(72) Inventors: Masaki Takahashi, Saitama (JP); Tsutomu Narita, Saitama (JP); Yuka Amamori, Saitama (JP); Hiroshi Sakama, Saitama (JP)

(73) Assignee: FUJIKURA COMPOSITES INC., Tokyo (JP)

( * ) Notice: Subject to any disclaimer, the term of this patent is extended or adjusted under 35 U.S.C. 154(b) by 133 days.

(21) Appl. No.: 16/482,960

(22) PCT Filed: Aug. 17, 2017

(86) PCT No.: PCT/JP2017/029538
§ 371 (c)(1),
(2) Date: Aug. 1, 2019

(87) PCT Pub. No.: WO2018/142652
PCT Pub. Date: Aug. 9, 2018

(65) Prior Publication Data
US 2019/0372086 A1    Dec. 5, 2019

(30) Foreign Application Priority Data

Feb. 3, 2017 (JP) .............................. JP2017-018427

(51) Int. Cl.
*H01M 12/06* (2006.01)
*H01M 50/60* (2021.01)

(52) U.S. Cl.
CPC ........... *H01M 50/60* (2021.01); *H01M 12/06* (2013.01)

(58) Field of Classification Search
CPC ....... H01M 50/00; H01M 50/60; H01M 12/06
See application file for complete search history.

(56) References Cited

U.S. PATENT DOCUMENTS

| 4,626,482 A | 12/1986 | Hamlen et al. |
| 5,650,241 A * | 7/1997 | McGee ............... H01M 12/065 429/67 |

FOREIGN PATENT DOCUMENTS

| JP | S52-022526 U | 2/1977 |
| JP | S54-137732 U | 9/1979 |

(Continued)

OTHER PUBLICATIONS

Japanese Office Action and English Translation for Patent Application No. 2018-565914 dated Jan. 7, 2020.

(Continued)

*Primary Examiner* — Kenneth J Douyette
(74) *Attorney, Agent, or Firm* — McCormick, Paulding & Huber PLLC

(57) ABSTRACT

A metal-air battery is comprised by a metal-air battery unit having a plurality of juxtaposed metal-air battery cells with a small number of components and a simple structure for injection of the electrolytic solution into each cell. Each metal-air battery cell has an air electrode, a metal electrode arranged to face the air electrode, and a casing configured to support the air electrode and the metal electrode. Each casing includes an air chamber and a liquid chamber. Each air chamber has an upper part opened to the outside. The casing has a liquid feeding port communicating with the liquid chamber for admitting an electrolytic solution when the metal-air battery unit is lowered into a container of electrolytic solution.

8 Claims, 3 Drawing Sheets

(56) References Cited

FOREIGN PATENT DOCUMENTS

| | | |
|---|---|---|
| JP | S55-061972 U | 4/1980 |
| JP | S56-034384 Y | 8/1981 |
| JP | S59-028609 Y | 8/1984 |
| JP | S62-177873 A | 8/1987 |
| JP | 2002-151167 A | 5/2002 |
| JP | 2015-210910 A | 11/2015 |
| JP | 2016-071986 A | 5/2016 |
| JP | 2016-076319 A | 5/2016 |
| JP | 2016-131063 A | 7/2016 |
| JP | 2016-152133 A | 8/2016 |
| JP | 2017-004644 A | 1/2017 |

OTHER PUBLICATIONS

International Search Report for Application No. PCT/JP2017/029538 dated Oct. 18, 2017.
Office Action for Korean Patent Application No. 10-2019-7024421 dated Jul. 20, 2021.

\* cited by examiner

METAL-AIR BATTERY AND METHOD OF USING THE SAME

CROSS-REFERENCE TO RELATED APPLICATIONS

This application is a National Stage application of International Patent Application No. PCT/JP2017/029538 filed on Aug. 17, 2017, which claims priority to Japanese Patent Application No. JP2017-018427 filed on Feb. 3, 2017, each of which is hereby incorporated by reference in its entirety.

FIELD OF THE INVENTION

The present invention relates to a metal-air battery having a plurality of metal-air battery cells and a method of using the same.

BACKGROUND OF THE INVENTION

In a metal-air battery, an oxidation-reduction reaction of oxygen occurs in an air electrode as a positive electrode by using oxygen of the ambient air as a positive electrode active material. Meanwhile, an oxidation-reduction reaction of metal occurs in a metal electrode as a negative electrode. The metal-air battery has a high energy density and is expected to serve as an emergency power source or the like in the event of a disaster or the like. Power generation starts by feeding an electrolytic solution to the metal-air battery.

In the prior art, various types of metal-air battery structures have been proposed (for example, see Japanese Unexamined Patent Application Publication No. 2016-131063, Japanese Unexamined Patent Application Publication No. 2016-71986, Japanese Unexamined Patent Application Publication No. 62-177873, Japanese Unexamined Patent Application Publication No. 2015-210910 and Japanese Unexamined Patent Application Publication No. 2016-152133).

In the technique of Japanese Unexamined Patent Application Publication No. 2016-131063, power is generated by injecting an electrolytic solution into a cell formed by integrating a metal electrode and an air electrode into a casing.

In the technique of Japanese Unexamined Patent Application Publication No. 2016-71986, a container that contains an electrolytic solution is prepared separately from the cell formed by integrating the metal electrode and the air electrode into the casing, and the cell is inserted into the container, so that the electrolytic solution flows into the cell, and power is generated.

Japanese Unexamined Patent Application Publication No. 62-177873 discusses a configuration of making the metal electrode and the air electrode into contact with the electrolytic solution by inserting the cell having the metal electrode and the air electrode into a tank containing the electrolytic solution.

In the technique of Japanese Unexamined Patent Application Publication No. 2015-210910, the metal electrode and the air electrode are disposed in one of two regions obtained by bisecting a vertically long casing, and the electrolytic solution is injected into only one of the regions. In addition, a battery reaction may stop by moving the electrolytic solution into the other region by vertically reversing the casing.

Japanese Unexamined Patent Application Publication No. 2016-152133 discusses a metal-air battery in which a plurality of metal-air battery cells are connected. The electrolytic solution is individually injected into each metal-air battery cell.

SUMMARY OF THE INVENTION

However, documents disclosed in the prior art fail to discuss a technique of forming the metal-air battery unit with a small number of components and a simple structure by juxtaposing a plurality of metal-air battery cells and a metal-air battery structure capable of simplifying injection of the electrolytic solution into each cell.

Japanese Unexamined Patent Application Publication No. 2016-131063, Japanese Unexamined Patent Application Publication No. 2016-71986, Japanese Unexamined Patent Application Publication No. 62-177873 and Japanese Unexamined Patent Application Publication No. 2015-210910 fail to consider a technique of obtaining a desired electric output power by juxtaposing a plurality of cells.

That is, the techniques of Japanese Unexamined Patent Application Publication No. 2016-131063, Japanese Unexamined Patent Application Publication No. 2016-71986, Japanese Unexamined Patent Application Publication No. 62-177873 and Japanese Unexamined Patent Application Publication No. 2015-210910 are based on a single cell structure, and do not consider a structure in which the same type of cells are combined. For example, Japanese Unexamined Patent Application Publication No. 2016-71986 discusses a cell structure in which the metal electrode and the air electrode are oriented in a horizontal direction to face each other in a vertical direction. In such a cell structure, it is difficult to connect a plurality of cells in series. In addition, for example, Japanese Unexamined Patent Application Publication No. 62-177873 discusses a cell structure in which a pair of air electrodes are provided in the inner side, and a pair of metal electrodes are provided in the outer side. However, in order to juxtapose the cells in the technique of Japanese Unexamined Patent Application Publication No. 62-177873, it is predicted that the structure becomes complicated because it is necessary to devise a cell connection structure or the like.

In any case, in the techniques of Japanese Unexamined Patent Application Publication No. 2016-131063, Japanese Unexamined Patent Application Publication No. 2016-71986, Japanese Unexamined Patent Application Publication No. 62-177873 and Japanese Unexamined Patent Application Publication No. 2015-210910, it is difficult to form the metal-air battery unit obtained by juxtaposing a plurality of metal-air battery cells with a small number of components and a simple structure.

In the structures discussed in Japanese Unexamined Patent Application Publication No. 2016-131063, Japanese Unexamined Patent Application Publication No. 2016-71986, Japanese Unexamined Patent Application Publication No. 62-177873 and Japanese Unexamined Patent Application Publication No. 2015-210910, the size easily increases because it is necessary to devise the cell connection structure in order to juxtapose a plurality of cells. In addition, for example, in the technique of Japanese Unexamined Patent Application Publication No. 62-177873, a space for moving the electrolytic solution is necessary in the casing, so that the size of the casing becomes double or more the space for placing the metal electrode and the air electrode. Finally, using each of techniques of the patent documents, it is difficult to appropriately promote miniaturization of the metal-air battery.

In regard to injection of the electrolytic solution, in the techniques of Japanese Unexamined Patent Application Publication No. 2016-131063, Japanese Unexamined Patent Application Publication No. 2016-71986, Japanese Unexamined Patent Application Publication No. 62-177873 and Japanese Unexamined Patent Application Publication No. 2015-210910, a user personally injects the electrolytic solution into the cell, so that the injection takes time. Furthermore, a complicated structure is necessary for improving a sealing property of the metal-air battery cell in order to prevent the electrolytic solution from overflowing from the cell during the injection.

In the techniques of Japanese Unexamined Patent Application Publication No. 2016-71986 and Japanese Unexamined Patent Application Publication No. 62-177873, it is difficult to obtain a configuration capable of appropriately injecting the electrolytic solution into each cell due to the structure in which a plurality of cells are juxtaposed. For this reason, the structure for injecting the electrolytic solution into each cell becomes complicated, or it is difficult to appropriately inject the electrolytic solution into each cell.

Japanese Unexamined Patent Application Publication No. 2016-152133 discusses a structure in which a plurality of metal-air battery cells are connected. However, in the technique of Japanese Unexamined Patent Application Publication No. 2016-152133, a liquid feeding port is provided in each metal-air battery cell, and it is necessary to individually feed the electrolytic solution to a plurality of metal-air battery cells, so that injection of the electrolytic solution takes time. In addition, in the technique of Japanese Unexamined Patent Application Publication No. 2016-152133, a casing, a lid, and the like are necessary in addition to a plurality of metal-air battery cells. Furthermore, the metal-air battery becomes relatively large-sized in order to appropriately inject the electrolytic solution to each metal-air battery cell.

In view of the aforementioned problems, the present invention provides a metal-air battery and a method of using the same, capable of forming a metal-air battery unit in which a plurality of metal-air battery cells are juxtaposed with a small number of components and a simple structure, and simplifying injection of the electrolytic solution into each cell.

According to an aspect of the invention, there is provided a metal-air battery including a metal-air battery unit having a plurality of juxtaposed metal-air battery cells, the metal-air battery cell having an air electrode, a metal electrode arranged to face the air electrode, and a casing configured to support the air electrode and the metal electrode, wherein each casing has an air chamber and a liquid chamber, an upper part of the air chamber is opened to the outside, and the casing has a liquid feeding port communicating with the liquid chamber.

According to the present invention, it is preferable that the liquid feeding port is provided on at least any one of a bottom part and a side part of the casing.

According to the present invention, it is preferable that at least a part of the metal electrode is arranged to face the liquid feeding port.

According to the present invention, it is preferable that the metal electrode is supported by the casing and has a lower part as a free end.

According to the present invention, it is preferable that the metal-air battery unit is configured by combining two types of components of a composite component of the metal-air battery cell and a side wall portion.

According to the present invention, it is preferable that a metal-air battery includes the metal-air battery unit described above and a housing capable of housing an electrolytic solution, wherein the metal-air battery unit is inserted into the housing that houses the electrolytic solution while the opened upper part of the air chamber faces upward, and the electrolytic solution is injected into the liquid chamber through the liquid feeding port.

According to another aspect of the present invention, there is provided a method of using a metal-air battery, including: inserting the metal-air battery unit described above into a container that houses an electrolytic solution while the opened upper part of the air chamber faces upward; and starting power generation.

According to the present invention, the power generation may stop by removing the metal-air battery unit inserted into the container.

Using the metal-air battery according to the present invention, it is possible to form the metal-air battery unit having a plurality of juxtaposed metal-air battery cells with a small number of components and a simple structure and simplify injection of the electrolytic solution into each metal-air battery cell.

DETAILED DESCRIPTION

An embodiment of the present invention (hereinafter, simply referred to as "embodiment") will now be described in details. Note that the invention is not limited by the following embodiments, and various changes or modifications may be possible within the spirit and scope of the invention.

Figure 1:
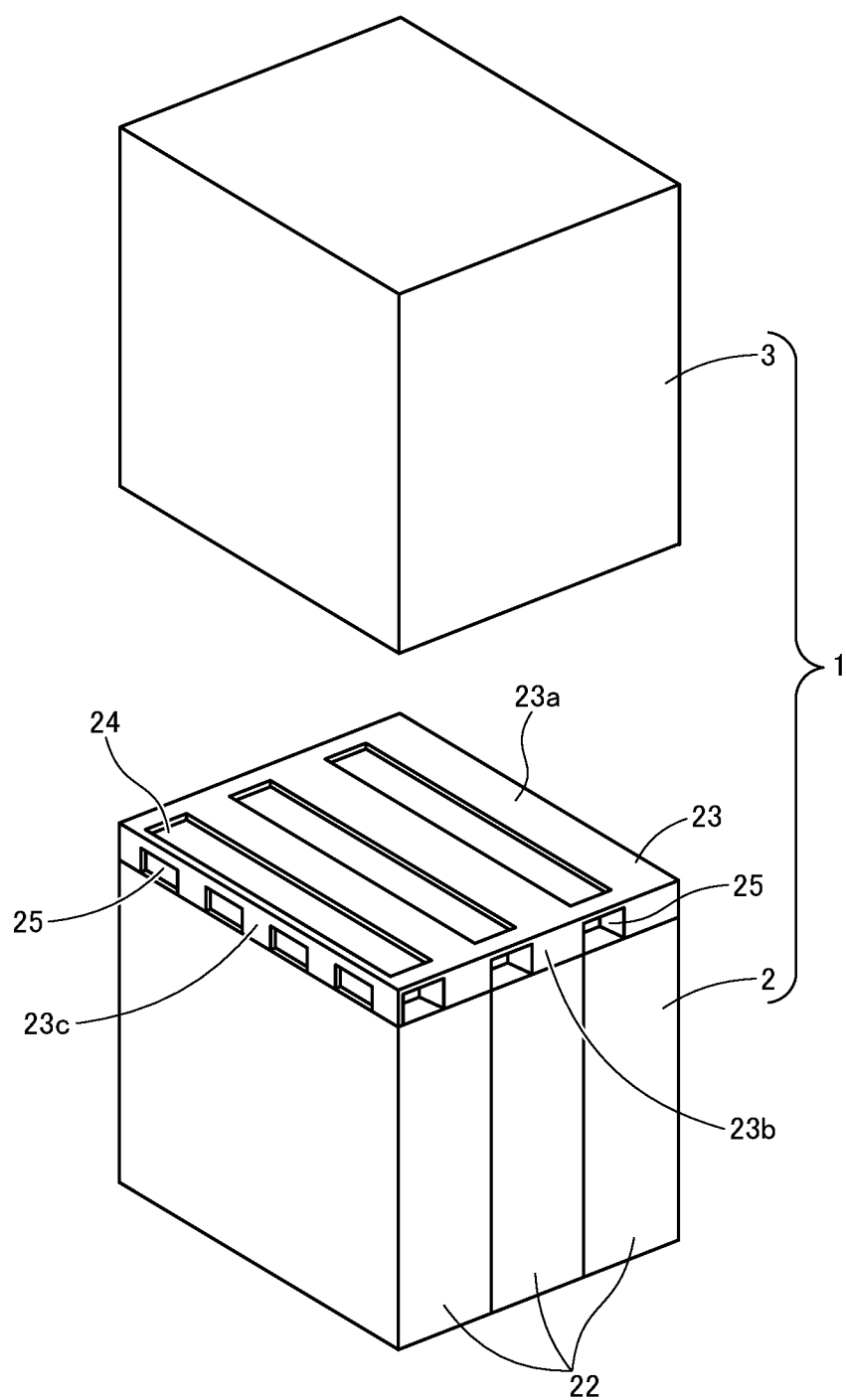
FIG. 1 is a perspective view illustrating a metal-air battery according to an embodiment of the invention.

As illustrated in FIG. 1, a metal-air battery 1 includes a metal-air battery unit 2 and a housing 3.

As illustrated in FIG. 1, the metal-air battery unit 2 is configured by juxtaposing, for example, three metal-air battery cells 22. The number of the metal-air battery cells 22 may be set to any number such as two, four, or more without a particular limitation.

The metal-air battery unit 2 is formed by combining a plurality of metal-air battery cells 22 having the same structure. The structure of the metal-air battery cell 22 will be described below.

As illustrated in FIG. 1, a ceiling portion 23 is installed on an upper face of the three metal-air battery cells 22. For example, the ceiling portion 23 has first openings 24 provided on the upper face 23a. In addition, as illustrated in FIG. 1, second openings 25 are provided on a side face of the ceiling portion 23 (on the left side face of FIG. 1). Furthermore, although not shown in the drawings, an opening may also be provided on the back face or the right side face of the ceiling portion 23.

Note that the numbers or locations of the first opening 24 and the second opening 25 illustrated in FIG. 1 are just for exemplary purposes. That is, one opening or a plurality of openings may also be provided. In addition, any one of the first opening 24 and the second opening 25 may be omitted.

Furthermore, the ceiling portion 23 may be omitted, or any other member may be provided instead of the ceiling portion 23.

Each opening 24 or 25 of FIG. 1 serves as an air hole. Alternatively, for example, an external connection terminal (not shown) for supplying the battery output power to the outside may be provided in the location of the second opening 25. The external connection terminal may include a connector, a USB terminal, or the like without a particular limitation. A plurality of external connection terminals may also be provided. For example, a mobile device may be directly connected to the external connection terminal of the metal-air battery unit 2 to supply power. Alternatively, for example, a connection board such as a USB hub may be connected to the external connection terminal of the metal-air battery unit 2, so that the power may be supplied to a plurality of mobile devices via the connection board.

As described below, the housing 3 of FIG. 1 can serve as a container capable of containing the electrolytic solution. However, when the metal-air battery 1 is stored without being used, for example, the housing 3 of FIG. 1 is put on the metal-air battery unit 2 from the top. As a result, it is possible to protect the metal-air battery unit 2 such that dust or the like does not intrude through the openings 24 and 25.

When the housing 3 is put on the metal-air battery unit 2 from the top, the housing 3 and the metal-air battery unit 2 can be held and integrated. In this case, if a handle is attached to the outer face of the housing 3, the metal-air battery 1 can be carried conveniently.

Although the shape of the housing 3 is not limited, the housing 3 preferably has an external shape similar to that of the metal-air battery unit 2 and larger than the metal-air battery unit 2.

Figure 2:
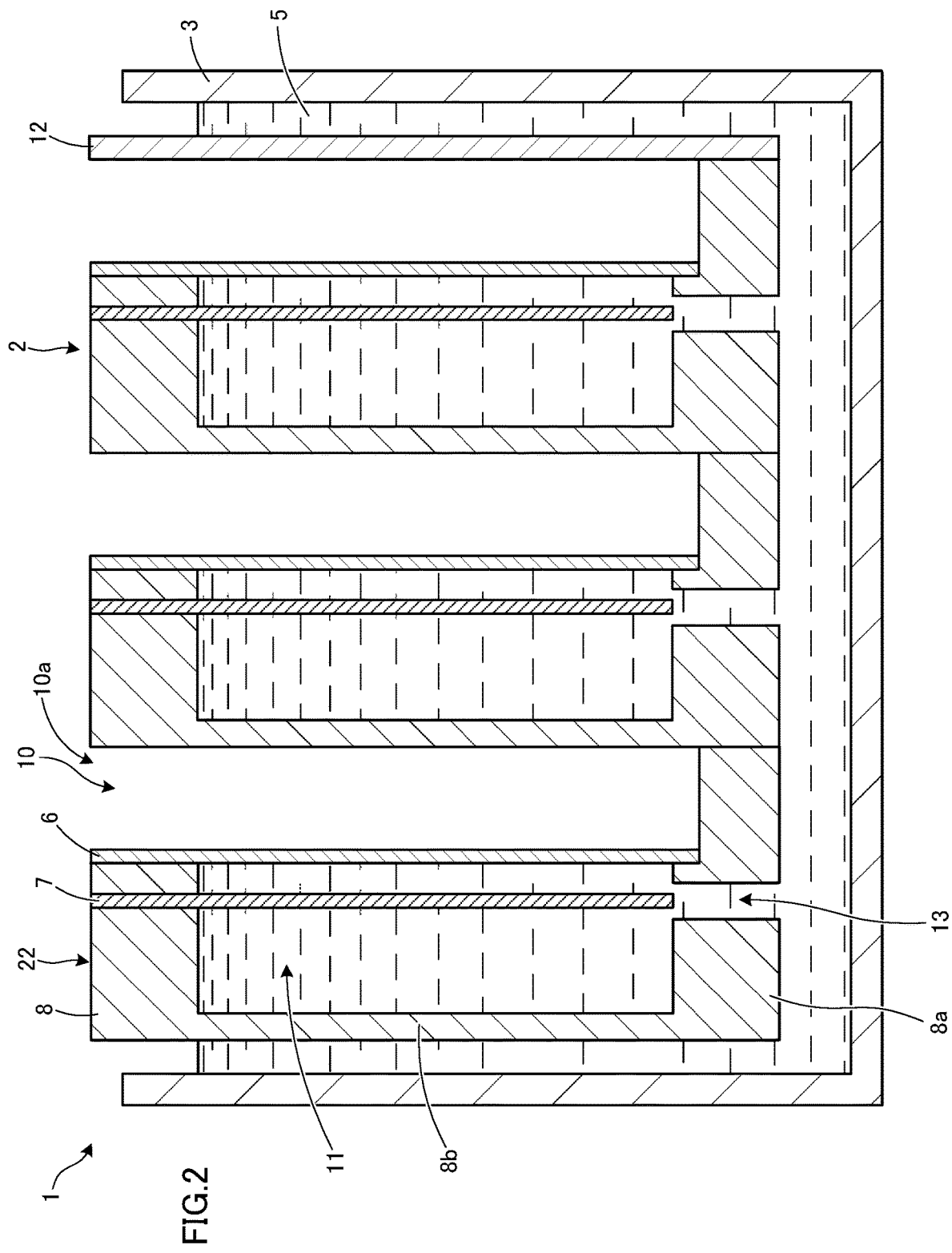
FIG. 2 is a cross-sectional view illustrating the metal-air battery according to an embodiment of the invention.

FIG. 2 is a cross-sectional view illustrating the metal-air battery 1 taken by vertically reversing the housing 3 oppositely to the state of FIG. 1 while the metal-air battery unit 2 is inserted into the housing 3 that houses the electrolytic solution 5.

As illustrated in FIG. 2, each metal-air battery cell 22 includes an air electrode 6, a metal electrode 7, and a casing 8. As illustrated in FIG. 2, the air electrode 6 and the metal electrode 7 are individually supported by the casing 8. The air electrode 6 and the metal electrode 7 are arranged to face each other with a predetermined interval in a horizontal direction (left-right direction on the paper plane).

As illustrated in FIG. 2, the casing 8 of each metal-air battery cell 22 includes an air chamber 10 and a liquid chamber 11. As illustrated in FIG. 2, the upper part of the air chamber 10 has an opening 10a opened to the outside. Note that the ceiling portion 23 of FIG. 1 is not illustrated in FIG. 2. The air is guided from each opening 24 and 25 of the ceiling portion 23 of FIG. 1 to the air chamber 10 of FIG. 2.

Note that, in the embodiment illustrated in FIG. 2, each of the right side faces of each air chamber 10 of the metal-air battery cell 22 illustrated in the left side and the metal-air battery cell 22 illustrated in the center includes the side face of the casing 8 of the neighboring right metal-air battery cell 22. In this manner, by supplementing a part of the side face of the air chamber 10 with the casing 8 of the neighboring metal-air battery cell 22, it is possible to reduce the thickness of each metal-air battery cell 22, implement miniaturization of the metal-air battery unit 2, and further implement miniaturization of the metal-air battery 1. However, the right side face of the air chamber 10 of the metal-air battery cell 22 placed in the right half of FIG. 2 is formed by newly arranging a side wall portion 12.

As illustrated in FIG. 2, the air electrode 6 is arranged between the air chamber 10 and the liquid chamber 11. In this case, each of the upper, lower, and side parts of the air electrode 6 is preferably fixed to and supported by the casing 8. As illustrated in FIG. 2, the air electrode 6 is disposed in a state exposed to both the air chamber 10 and the liquid chamber 11.

As illustrated in FIG. 2, the metal electrode 7 is arranged at a predetermined distance from the air electrode 6 inside the liquid chamber 11. As illustrated in FIG. 2, the upper part of the metal electrode 7 is fixed to the casing 8, but the lower part has a free end (non-fixed).

As illustrated in FIG. 2, a liquid feeding port 13 communicating with the liquid chamber 11 is provided on the bottom part 8a of the casing 8. Therefore, as illustrated in FIG. 2, when the metal-air battery unit 2 is immersed in the housing 3 containing the electrolytic solution 5, the electrolytic solution 5 is simultaneously injected into each liquid chamber 11 through the liquid feeding port 13. In this case, as illustrated in FIG. 2, the level of the electrolytic solution 5 is lower than the opening 10a of the air chamber 10, and the electrolytic solution 5 does not flow into the air chamber 10.

As illustrated in FIG. 2, when the electrolytic solution 5 fills the liquid chamber 11, for example, assuming that the metal electrode 7 is formed of magnesium, an oxidation reaction occurs in the vicinity of the metal electrode 7 as indicated in the following formula (1). In addition, a reduction reaction occurs in the air electrode 6 as indicated in the following formula (2). A reaction indicated in the following formula (3) occurs as a whole in the magnesium-air battery to discharge electric charges.

$$2Mg \rightarrow 2Mg^{2+} + 4e^{-} \qquad (1)$$

$$O_2 + 2H_2O + 4e^{-} \rightarrow 4OH^{-} \qquad (2)$$

$$2Mg + O_2 + 2H_2O \rightarrow 2\ Mg(OH)_2 \qquad (3)$$

Note that, although the liquid feeding port 13 is provided on the bottom part 8a of the casing 8 in the embodiment of FIG. 2, it may be provided, for example, on the side part 8b of the casing 8 or both on the bottom part 8a and the side part 8b. In addition, the liquid feeding port 13 may also be provided on the upper part of the casing 8. However, in this case, it is necessary to place the liquid feeding port 13 under the opening 10a of the air chamber 10.

Although not shown in the drawings, a hole for discharging the gas such as hydrogen generated by a battery reaction from the liquid chamber 11 to the outside is provided around the metal electrode 7.

Figure 3:
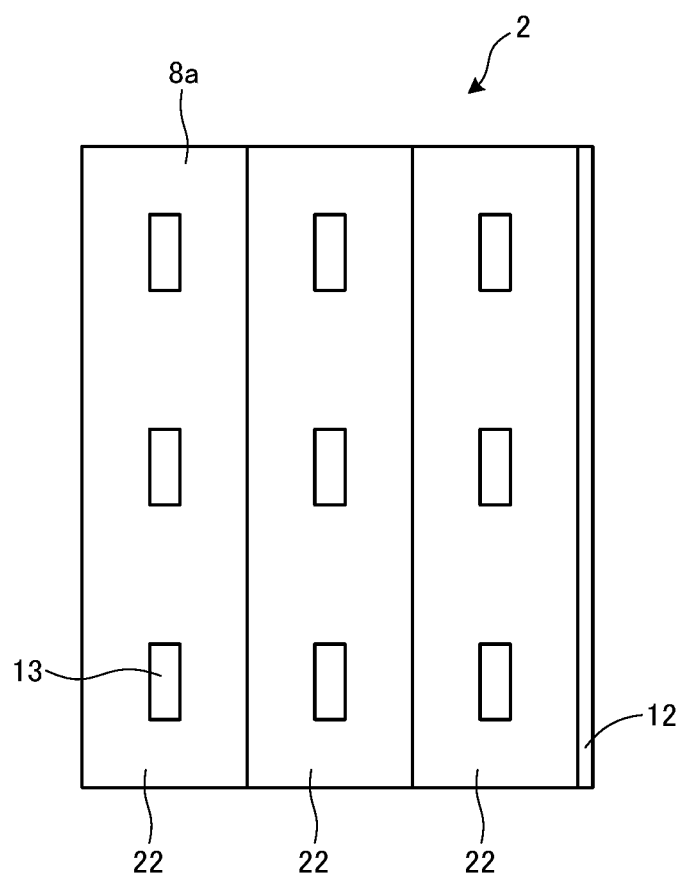
FIG. 3 is a bottom view illustrating the metal-air battery unit according to an embodiment of the invention.

However, in order to quickly feed the electrolytic solution 5 to the liquid chamber 11 of each metal-air battery cell 22, it is preferable to provide the liquid feeding port 13 on the bottom part 8a of the casing 8. In addition, a plurality of liquid feeding ports 13 may be provided on the bottom part 8a of each metal-air battery cell 22 as illustrated in FIG. 3. Note that the number of the liquid feeding ports 13 is not limited. Furthermore, the shape of the liquid feeding port 13 is not limited. For example, a plurality of small holes may be provided as illustrated in FIG. 3. Alternatively, at least one long hole may be provided as the liquid feeding port 13 in each metal-air battery cell 22.

As illustrated in FIG. 2, the metal electrode 7 is preferably arranged to face the liquid feeding port 13 provided on the bottom part 8a of the casing 8. A product generated during the oxidation-reduction reaction between the metal electrode 7 and the air electrode 6 is easily discharged to the housing 3 side through the liquid feeding port 13. As a result, it is possible to suppress a failure of the electrode or degradation of electrical properties that may be generated when the product is accumulated in each metal-air battery cell 22.

Instead of the bottom part 8a of the casing 8, the liquid feeding port 13 may be arranged under the side part 8b of the casing 8, and the metal electrode 7 may be arranged to face the liquid feeding port 13. The phrase "under the side part 8b" means a lower half of the height of the side part 8b, preferably a ½ part or lower of the height, more preferably a ⅓ part or lower of the height. Similarly, this also provides the product discharge effect. Note that the location of the liquid feeding port 13 does not matter if the electrolytic solution 5 can be injected into the liquid chamber 11 without the electrolytic solution 5 in the housing 3 reaching the upper part of the metal-air battery unit 2 when the metal-air battery unit 2 is inserted into the housing 3.

The lower part of the metal electrode 7 has a free end as illustrated in FIG. 2. As a result, it is possible to appropriately arrange the metal electrode 7 to face the liquid feeding port 13. In addition, since the lower part of the metal electrode 7 has a free end, the lower part of the metal electrode 7 becomes swingable. For this reason, when the product accumulates between the air electrode 6 and the metal electrode 7, the metal electrode 7 can be bent. Therefore, it is possible to alleviate the pressing force caused by the product and suppress damage to the metal electrode 7 and the air electrode 6.

In the metal-air battery 1 according to this embodiment, a plurality of metal-air battery cells 22 having the same structure including the air electrode 6, the metal electrode 7, and the casing 8 are juxtaposed as illustrated in FIG. 1. In addition, as illustrated in FIG. 2, the air chamber 10 of the metal-air battery cell 22 is opened on the side part (the right side in the drawing) separate from the liquid chamber 11 as well as on its upper part. Furthermore, a plurality of metal-air battery cells 22 are juxtaposed, and the side wall portion 12 is disposed in the first stage of the metal-air battery cells 22. In this manner, according to this embodiment, the metal-air battery unit 2 is configured by combining two types of components, that is, a composite component of the metal-air battery cell 22 and the side wall portion 12. Note that the "composite component" refers to a plurality of members including the electrode and the casing of the metal-air battery cell 22. As a result, according to this embodiment, it is possible to form the metal-air battery unit 2 with a small number of components and a simple structure. In addition, the air chamber 10 in which only the upper part is opened can be appropriately formed in each thin metal-air battery cell 22. Therefore, it is possible to implement miniaturization of the metal-air battery unit 2 having a plurality of metal-air battery cells 22.

According to this embodiment, as illustrated in FIG. 2, the electrolytic solution 5 is injected into the housing 3, and the metal-air battery unit 2 is immersed in the housing 3. In this case, the electrolytic solution 5 naturally enters the liquid chamber 11 of each metal-air battery cell 22 through the liquid feeding port 13 to fill the liquid chamber 11. In this manner, a user is not necessary to personally inject the electrolytic solution 5 into each metal-air battery cell 22, an is only necessary to insert the metal-air battery unit 2 into the housing 3 containing the electrolytic solution 5. Therefore, it is possible to simplify injection of the electrolytic solution 5 into each metal-air battery cell 22. Furthermore, according to this embodiment, it is possible to form the liquid feeding port 13 communicating with each liquid chamber 11 with a simple structure for a plurality of metal-air battery cells 22.

As described above, using the metal-air battery 1 according to this embodiment, it is possible to form the metal-air battery unit 2 by juxtaposing a plurality of metal-air battery cells 22 with a small number of components and a simple structure. In addition, it is possible to simplify injection of the electrolytic solution 5 into each metal-air battery cell 22.

According to this embodiment, it is possible to simply stop power generation by pulling up the metal-air battery unit 2 from the state of FIG. 2 and removing the electrolytic solution 5 from the liquid chamber 11 of each metal-air battery cell 22 through the liquid feeding port 13.

According to this embodiment, the housing 3 of FIG. 1 is a container capable of containing the electrolytic solution 5. Therefore, a user can quickly use the metal-air battery 1 in the event of emergency such as a disaster by reversing the housing 3 of FIG. 1, injecting the electrolytic solution 5 into the housing 3, and immersing the metal-air battery unit 2 in the electrolytic solution 5 of the housing 3 for power generation. Note that a mark may be provided to indicate a reference level of the electrolytic solution 5 injected into the housing 3. As a result, a user can inject an appropriate amount of the electrolytic solution 5 into the housing 3.

Note that any container other than the housing 3 may be employed as a container for containing the electrolytic solution 5.

Each electrode of each metal-air battery cell 22 may be connected in series or in parallel without limiting to a particular wiring method.

According to this embodiment, the metal-air battery 1 may include a magnesium-air battery or any other types of metal-air batteries.

According to the present invention, it is possible to obtain the metal-air battery with a compact configuration even if a plurality of metal-air battery cells are connected and simplify injection of the electrolytic solution. Therefore, it is possible to effectively apply the metal-air battery unit according to the present invention as a power source for emergency such as a disaster.

This application is based upon and claims the benefit of priority from Japanese Patent Application No. 2017-018427 filed in Japan Patent Office on Feb. 3, 2017, the entire contents of which are incorporated herein by reference.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A metal-air battery comprising:
a metal-air battery unit having a plurality of juxtaposed metal-air battery cells, each metal-air battery cell having an air electrode, a metal electrode arranged to face the air electrode, and a casing configured to support the air electrode and the metal electrode, the air electrode being exposed at an outer side of the casing, and each metal-air battery cell being provided with a liquid chamber and an air chamber, the air chamber being open at an upper part and open at a side part that is separate from the liquid chamber,
wherein the metal-air battery cell unit has the plurality of the metal-air battery cells juxtaposed to one another such that the air chambers are respectively formed between neighboring metal-air battery cells of the metal-air battery cell unit, and the side part of each air chamber is supplemented by the casing of an associated neighboring metal-air battery cell of the metal-air battery cell unit, whereby each air chamber is open only at the upper part thereof.

2. The metal-air battery according to claim 1, wherein the liquid feeding port is provided on at least any one of a bottom part and a side part of the casing.

3. The metal-air battery according to claim 2, wherein at least a part of the metal electrode is arranged to face the liquid feeding port.

4. The metal-air battery according to claim 1, wherein the metal electrode is supported by the casing and has a lower part as a free end.

5. The metal-air battery according to claim 1, wherein the metal-air battery unit is configured by combining two types of components, one being a composite component of the metal-air battery cell and the other being a side wall portion.

6. A method of activating a metal-air battery comprising:
providing a metal-air battery unit as defined in claim 1 with a liquid feeding port communicating with the liquid chamber within the casing; and a housing housing an electrolytic solution; and wherein the metal-air battery unit is inserted into the housing that houses the electrolytic solution while the open upper part of the air chamber faces upward, and the electrolytic solution is allow to be injected into the liquid chamber through the liquid feeding port.

7. A method of using a metal-air battery, comprising:
inserting the metal-air battery unit as defined in claim 1 into a container that houses an electrolytic solution while the open upper part of the air chamber faces upward, and the electrolytic solution enters the liquid chamber through a liquid port at the bottom of the chamber to start power generation.

8. The method according to claim 7, wherein the power generation is stopped by removing the metal-air battery unit inserted into the container.

* * * * *